Nov. 2, 1965     G. R. THOMPSON ETAL     3,215,387
DETACHABLE HORIZONTALLY DISPOSED SUPPORT
Filed July 24, 1963     2 Sheets-Sheet 1
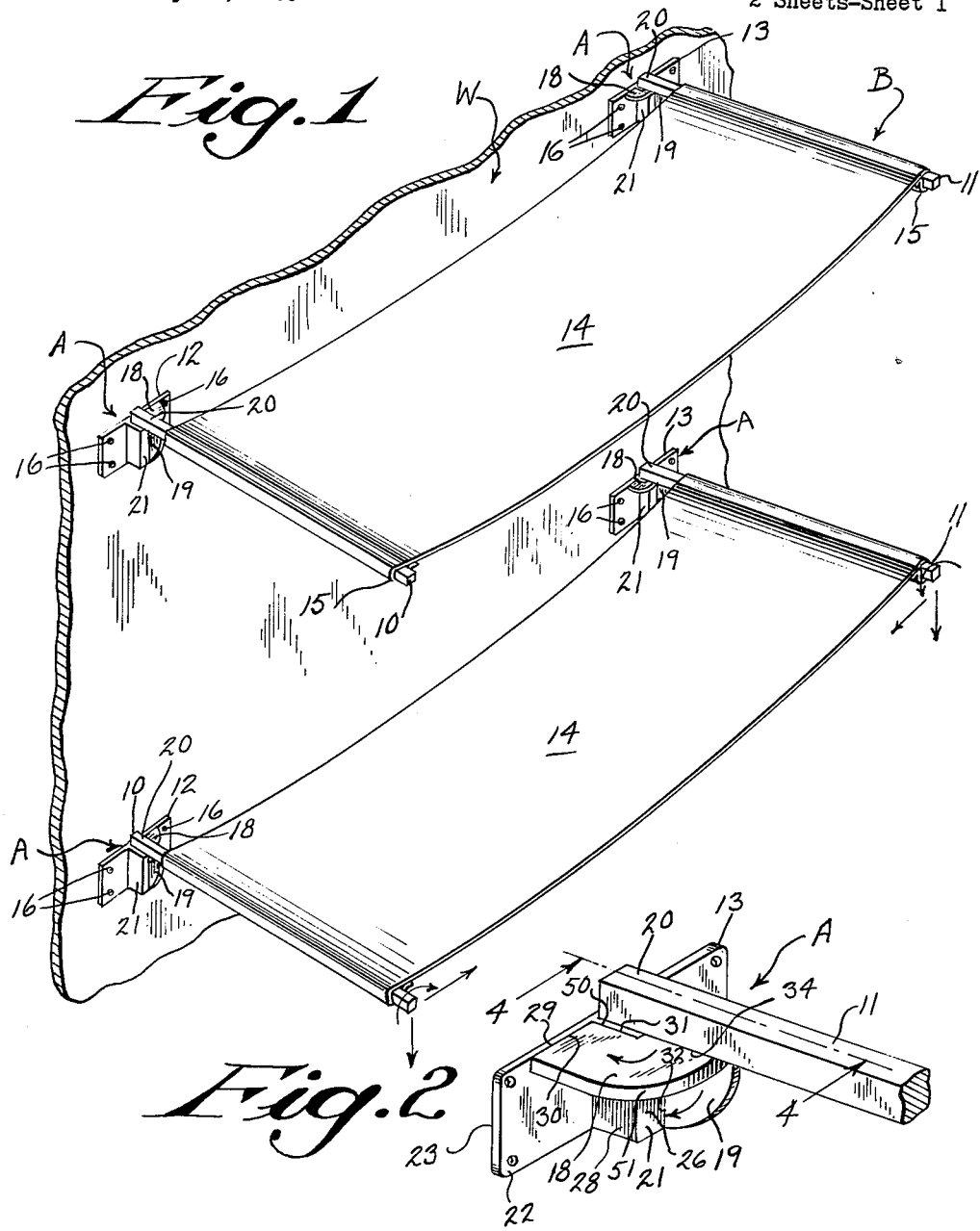
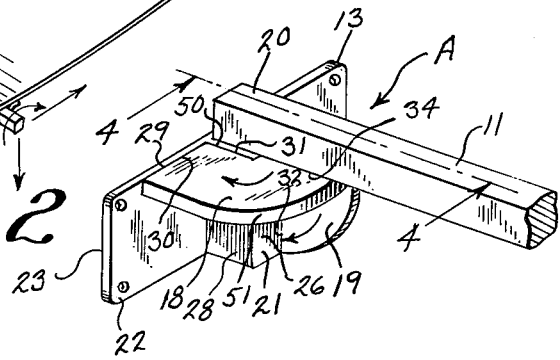
INVENTORS
GLENN R. THOMPSON
KENNETH E. THOMPSON
BY *George W. Wright, Jr.*

INVENTORS
GLENN R. THOMPSON
KENNETH E. THOMPSON

BY George W. Wright

United States Patent Office 3,215,387
Patented Nov. 2, 1965

3,215,387
DETACHABLE HORIZONTALLY
DISPOSED SUPPORT
Glenn R. Thompson and Kenneth E. Thompson, both of
Box 80 C, Peshtigo, Wis.
Filed July 24, 1963, Ser. No. 297,298
4 Claims. (Cl. 248—224)

This invention appertains to supports and more particularly to new and useful improvements in portable, detachable, interlocking suspension arms and the like for supporting relatively heavy loads.

Supporting arms extending horizontally from a surface to which the arm is attached are old, and well known in the art, and various arms have been devised to be utilized in pairs for supporting shelves and other objects. However, in the past, where the loads on such arms were relatively heavy and particularly where it was desirable to detachably secure the arms to the support, complicated extra strengthening means were resorted to, such an angularly extending brace arms. There has long been a need therefore, for a means for strengthening the detachable suspension arm, particularly where heavy loads are to be carried by the arm, and wherein such means is fairly compact and simple. One of the many uses for the interlocking suspension arms of the present invention is in the portable bunk field to provide a quick and easy means for setting up a bunk associated with a vertical supporting surface and for removing the same where it can be stored and kept out of the way, with the object in view of eliminating outside supporting members for the arms. Obviously, the downward pressure, side pressure and angular pressure on such arms can be very great when a person is reclining on the bunk, and thus extra bracing has invariably been needed to furnish proper support.

It is, therefore, a primary object of the present invention to provide a novel interlocking suspension arm which can be quickly and easily associated with an adapter bracket in such a manner to give strength to the arm regardless of the pressure exerted thereon.

Another important object of the present invention is to provide an adapter bracket which may be secured to a vertical supporting surface, and which is adapted to receive a novel interlocking suspension arm having means strengthening the support of the arm to hold relatively heavy loads.

A further object of our present invention is to provide an improvement in portable, detachable, interlocking suspension arms adapted to be used in pairs to support a flexible canvas member therebetween, for the purpose of providing a portable bunk and each arm thereon being provided with a horizontally extending piece to strengthen the arm against inner pressure and movement and a vertically extending piece to strengthen the arm against downward pressure and movement, both pieces cooperating with a depending leg which is, in turn, received in a slot formed in our novel adapter.

A more specific object of our present invention is to provide an adapter having a vertical slot therethrough, in which is received a depending leg from the suspension arm, the leg being of a size and configuration to fit the slot with the closest tolerance possible, and wherein a horizontal piece secured to the arm adjacent the depending leg is spaced therefrom to snugly receive one wall of the adapter and the vertical piece is spaced from said depending leg to receive another wall of the adapter. All of the parts have a close tolerance to properly distribute various pressure placed upon them through the suspension arm and to give strength and rigidity to the arm.

Another important object of our present invention is to provide an adapter and interlocking suspension arm, wherein all component parts shall be of such size, and of such materials, to exert the most and best possible relief from a downward pressure, side pressure or angular pressure; and wherein these component parts align in such a manner as to distribute the pressure on the support and arms, regardless of the purpose for which the same is utilized.

A still further object of our present invention is to provide a novel adapter to be secured to a vertical supporting surface and an improvement in interlocking suspension arms adapted to be used in pairs for supporting various items therebetween, such as a canvas and the like for portable bunks, mail sacks when utilized in numbers for sorting mail, cribs and seats, and which, when set in proper position, will readily distribute the pressure evenly in many directions thus alleviating the necessity of providing cumbersome and complicated bracing and extra supporting means.

A further object of our present invention is to provide a simple, practical and reliable construction that is economical to manufacture, easy to assemble and positive in its operation.

With the above and other objects in view, which will more readily appear as the nature of the invention is better understood, the same consists in the novel construction, combination and arrangement of parts, hereinafter more fully described, illustrated and claimed.

A preferred and practical embodiment of our invention is shown in the accompanying drawings, in which FIGURE 1 is a perspective view showing our novel interlocking suspension arms utilized to support bunks in relation to a vertical surface, one above the other;

FIGURE 2 is a fragmentary perspective view of our novel adapter and interlocking suspension arm removed from the supporting surface, the particular view relating to the right hand portion of the drawing of FIGURE 1;

Figure 3:
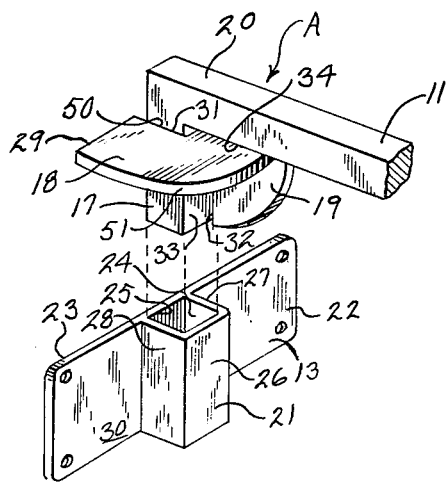
FIGURE 3 is a view similar to FIGURE 2 of the drawings, but showing the novel interlocking suspension arm removed from the bracket adapter to illustrate further details in its construction.
Figure 4:
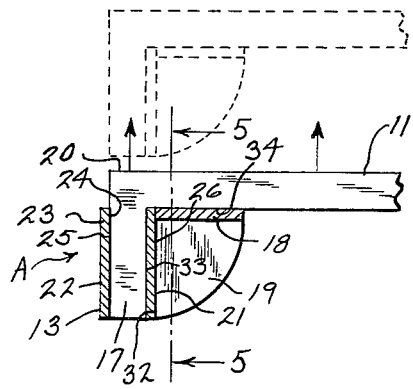
FIGURE 4 is a vertical section taken on the line 4—4 of FIGURE 2 of the drawings, and looking in the direction of the arrow, the novel interlocking suspension arm being shown in its operative position in relation to the adapter bracket in full lines and in its removed inoperative position in dotted lines.
Figure 5:
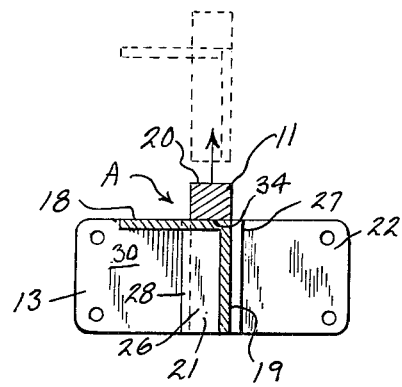
FIGURE 5 is a vertical transverse section taken on the line 5—5 of FIGURE 4 of the drawings, and looking in the direction of the arrows.

Referring now to the drawings in detail, wherein similar reference characters designate corresponding parts throughout the several views, the letter A generally indicates one type of our improved interlocking suspension arm and adapter bracket. In FIGURE 1 of the drawings, we have shown a typical portable bunk set up, wherein one bunk is provided above the other, but obviously, only one bunk can be used if desired. Therefore, only the construction of one bunk will be described in detail.

The bunk B includes broadly a pair of horizontally disposed supporting arms 10 and 11 and these arms, in turn, are detachably carried by a pair of adapter brackets 12 and 13. Between the arms 10 and 11, we provide a flexible length of material 14 which can be made of canvas, plastic, and the like and the ends are looped, as at 15, so that the respective arms 10 and 11 can be threaded therethrough. The adapter brackets 12 and 13, are, of course, secured to the wall surface W and any desired means can be used for this purpose, such as bolts, Anchormans and glue, but we have shown the same secured by utilizing four screws 16. When the arms 10 and 11 are in proper position in relation to the brackets 12 and 13 and the strip of material 14 is in place, a portable bunk is provided, and the same can easily be removed and stored away to allow for additional space when the bunk B is not in use. When, however, the bunk B is in its operative position, as shown, and a person is reclining thereon, relatively heavy pressures are exerted on the arms 10 and 11. For example, weight on the strip 14 tends to pull the unsupported ends of the arms 10 and 11 toward one another in the direction of the arrows at the same time there is a downward pressure exerted also as indicated by the arrows, and the combination of these two pressures may result in the tendency of the bars to rotate inwardly toward one another as indicated by the curved arrows.

As previously mentioned, in order to compensate for these relatively heavy pressures, extra angular bracing means had to be provided, and such means besides taking up extra space, required much dexterity in the setting up of the bunk and use thereof. Therefore, to properly distribute the pressures over a greater area and to relieve the pressures exerted on the depending leg 17 of each arm, we provide an inwardly and horizontally extending piece 18 and a vertically extending piece 19, both of which are firmly secured to the respective inner ends 20 of the arms 10 and 11. The construction of these pieces 18 and 19 and their relationship to the depending leg 17 and the adapter 21 of each adapter bracket 12 and 13 is extremely important, and will now be described in detail. It should be understood that the adapter bracket, the arms and pieces secured thereto, can be made of any desired material, such as plastic, wood and the like, but in the preferred form of our invention, all of the parts are formed from metal.

Referring now primarily to FIGURES 2 to 5, inclusive, it can be seen that the adapter bracket 13 is formed integral with the adapter 21 and actually, the adapter 21 can be utilized in conjunction with any type of bracket and any means for securing the same to a wall surface. If for example, the walls are slanted or curved, as would be found in boats and ships, then obviously, the plate 22 of the adapter bracket 13 would have its inner surface 23 shaped to conform to the supporting surface, and it is also obvious that this bracket can extend horizonatlly, as shown, or be placed vertically. In any event, the adapter 21 is provided with an internal bore or slot 24 and here again any desired shape may be utilized, but preferably the same is square to provide a rear wall 25, front wall 26 and side walls 27 and 28, respectively.

Arms 10 and 11 are identically formed and therefore, only one arm need be described in detail. Arm 11 is provided at one end with the depending leg 17 and this leg 17 is of a size and configuration to snugly fit within the slot or bore 24 of the adapter 21, and is manufactured to the closest tolerance possible to allow it to be inserted and removed with a minimum amount of effort, while still providing a positive bearing against the walls of the adapter at all times.

The leg 17 can be formed integral with the arm 11 or it can be attached thereto by welding, or it can be tapped for a bolt and the like.

From the description thus far, when the leg 17 is received in the adapter 21, the arm 11 is adapted to cooperate with the correspondingly spaced arm, such as arm 10, to support loads put on the strip 14 therebetween.

Relatively heavy loads, however, will place undue stress on the leg 17 and may cause the arm to bend in relation thereto, or cause the leg 17 to wedge within the slot or bore 24, thus making it difficult to remove and also there arises the possibility of the leg and arm being separated where they are joined.

To strengthen the tendency of the arms 10 and 11 to be pulled inwardly toward one another, the horizontal piece 18 is firmly secured to the arm, as shown, and it is important that the inner edge 29 engage the inner face 30 of the adapter bracket 13. If the adapter bracket 13 is not provided with a horizontally disposed surface 30, as shown, then obviously, the inner surface of the horizontally disposed piece 18 must engage snugly the supporting surface W. In any event, the piece 18 is formed and spaced from the leg 17 in such a manner that the angularly shaped slot 31 is provided. This slot 31 conforms to the thickness of the inner side wall 28 and the front wall 26 of the adapter 27, and snugly engages the surfaces of these walls.

Also secured to the arm 11 is the horizontally disposed piece 19 and this piece is provided with a straight, vertically extending leading edge 32 and this leading edge 32 is likewise spaced from the surface 33 of the depending leg 17 for the thickness of the front wall 26 of adapter 21 in such a manner that the edge 32 will snugly engage the wall 26. Piece 18 and piece 19 may be formed separately; however, preferably, they are formed from a single piece bent at right angles as shown more particularly in FIGURE 5 of the drawings, and firmly secured to the under surface 34 of the arm 11. Thus, it can be seen that the piece 18 tends to distribute any pressure from the arm 11 and any force which may cause the arm 11 to pull or rotate inwardly, in the direction of the arrow FIGURE 2 of the drawings, particularly since surface or edge 29 snugly engages the surface 30 of the adapter bracket 13. Further, the space 31 in reality provides a slot extending at right angles and snugly engages the respective surface of the side walls 28 and 26. Any downward pressure and force on the arm 11 is distributed by means of the leading edge 32 which engages the outer surface of the wall 26 of the adapter 21 and as previously brought out, these pieces greatly strengthen and cooperate with the leg 17 and the various component parts of the adapter 21 to give strength to the arms and to properly distribute the various pressures and force exerted on the arms.

In other words, all of the parts are in such a position and bonded together as one unit to create a structure which allows the relief and distribution of the downward pressure, side pressure and angular pressure, and thus adapts the arm to be utilized as a support for a portable bunk, as shown, and for many other uses. One of the more important other uses that might be mentioned lies in the fact that the arms 10 and 11 may be utilized to support mail sacks in rows when mail is being sorted, and the like, and it is again obvious that when it is desired to use the space for other purposes, the arms can be easily and quickly removed by a straight upward movement on the arms in the direction of the arrows FIGURES 4 and 5 of the drawings from the full line to the dotted line position, and thus, only the adapter bracket is left on the supporting wall W.

It should be noted that this portable bunk can be used in motels, and hotels, and readily set up in operative position when needed.

Figure 6:
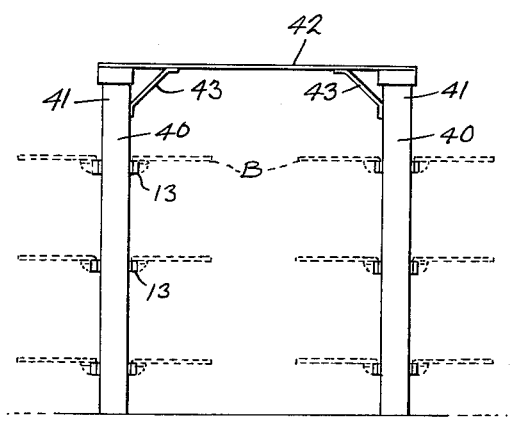
FIGURE 6 is an end elevational view showing one of the many uses of our invention, wherein a series of bunk beds are secured to supports, one above the other, for use in barracks, ship-board and the like, and FIGURE 7 is a top elevational view of a slightly modified form of the novel interlocking suspension arm shown in FIGURES 1 to 6, inclusive.
Figure 7:
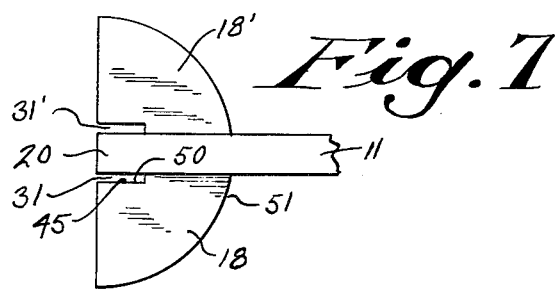

In FIGURE 6 of the drawings, we have shown how this portable bunk idea can be used in barracks or ships, where a great number of bunks are needed and we have merely illustrated spaced pairs of uprights 40 which are suitably braced at the upper ends 41 thereof by providing a crossbeam 42 and angle brackets 43. The angle brackets 13 are then set up in the proper spaced relation and the bunks may be quickly put in position as shown in tiers, one above the other, and on opposite sides of the supporting post 40 and when the same are not in use, the arms are lifted from the supporting brackets and easily stored away, thus giving ample space for other uses.

When our novel suspension arm is to be used for mail sacks or is to be used as a support in more than one direction, I provide a double brace 18' which is actually formed integral with the piece 18, and which extends on the opposite side of the arm, and is spaced and provided with the slot 31' to receive the wall 27 therebetween. Thus pressure and force exerted on either side of the arm will be properly distributed. Actually, pieces 18 and 18' would be formed as one unitary structure with the opening 45 of a size and configuration to fit around and snugly encompass the upper portions of the side walls 27, 28 and front wall 26. This, of course, then includes the aforementioned spaces or slots 31 and 31'.

While I have referred to the spaces between the walls 26 and 27 and corresponding edges of piece 18 as slots, actually the pieces 18 are L-shaped and each is provided with a side edge 50 formed as the right angle and the outside edge 51 being curved as shown. Thus, when piece 18 is secured to the under side of the arm and spaced from the depending leg 17 it forms a unitary structure and the L-shaped slot 31 results. Piece 18 is made as opposites for arms 10 and 11 so that each piece extends inwardly toward the pressure and forces, thus looking at FIGURE 1, piece 18 on the left side of the drawings for arm 10 extends inwardly toward the right, while piece 18 on the right side of the drawing for arm 11 extends inwardly toward the left.

Therefore, in the preferred form of the invention, the arm, depending leg 17, piece 18 and piece 19 are all constructed as a unit, and thus, obviously, the space between the leading edge of the piece 19 will be sufficient to just accommodate the thickness of the front wall 26. It should be readily apparent therefore, that the leg 17 and piece 18 and 19 act to properly and evenly distribute the pressures and forces over as great an area as possible and accomplish the same task that complicated and angularly extending braces have accomplished in the past.

In the operation of the device the depending leg 17 of either arm can be easily positioned in the slot or bore 24 of the adapter 21 when in operation, and can just as readily be removed so that the space can be utilized for other purposes. It should be kept in mind that the adapter 21 can be secured to many types of applicators so that the adapter bracket can be attached to different types of support materials, such as cement, brick, glass, metal, wood and the like, and as previously mentioned many types of securing means, such as screws, bolts, glue can be used for this purpose.

It should also be noted that the fabric 14 when the device is used as a bunk can be canvas, plastic or reinforced sleeping bags, and depending on the space between the arms many and varied uses are envisioned.

Thus, while we have shown and described certain specific embodiments of our invention, it will be understood that these embodiments are merely for the purpose of illustration and description, that various other forms may be devised and that changes may be made in the proportions and minor details of construction without departing from the spirit of the invention or scope of the appended claims:

What we claim as new is:

1. A support of the type adapted to be detachably mounted to a vertical surface and to carry a relatively heavy load, including a pair of adapter brackets secured to said vertical support, each bracket including a body having a vertical bore and slot therethrough, a pair of spaced parallel horizontally extending arms, each arm having a depending leg integral with the inner end thereof and of a size and configuration to be snugly received in the bore of said adapter bracket, means carried by each arm for carrying a load therebetween, means associated with each arm adjacent the depending leg thereof for contact with said adapter body to distribute the pressures exerted by the load evenly over a specific area, including a horizontally disposed piece secured to said arm and extending inwardly toward the opposite arm, and a vertically disposed piece having a leading edge contacting a vertical surface of said adapter bracket.

2. A horizontally disposed support of the type having a pair of spaced parallel horizontally disposed arms and means for carrying a load associated with said arms comprising an adapter bracket for each arm secured to a vertical suport, said adapter body including a rectangularly shaped vertically extending hollow housing forming a vertical bore or slot therethrough, each arm including a depending leg adjacent its inner end of a size and configuration to be received snugly in said bore, an L-shaped horizontally disposed pressure piece secured to the under portion of said arm and spaced from said leg for the thickness of said hollow housing for engagement with a wall of said housing and a portion of said adapter bracket, and a vertically disposed pressure piece secured adjacent said horizontally disposed piece having an inner edge spaced from said depending leg for the thickness of said hollow housing and adapted to engage a wall thereof, whereby side pressure, down pressure and angle pressure exerted by said loan on said arms will be relieved and absorbed by the depending leg, horizontal and vertical pressure pieces.

3. A horizontally disposed support as set forth in claim 2 wherein said vertically disposed pressure piece and horizontally disposed pressure piece are formed as a unitary structure and secured adjacent the under portion of a respective arm.

4. A horizontal support as set forth in claim 1 wherein said horizontally disposed piece extends laterally from each side of said arm and completely encompasses the adapter bracket body.

References Cited by the Examiner
UNITED STATES PATENTS

| 392,061 | 10/88 | Peckham | 248—224 |
|---|---|---|---|
| 479,424 | 7/92 | Huff et al. | 248—224 |
| 595,064 | 12/97 | Herbst | 248—224 X |
| 809,670 | 1/06 | Cover | 182—92 |
| 843,456 | 2/07 | Higbee et al. | 248—224 X |
| 2,776,442 | 1/57 | Edelen | 5—296 |
| 2,795,801 | 6/57 | Edelen | 5—296 X |
| 2,845,636 | 8/58 | Iaquinta et al. | 5—296 X |
| 2,940,604 | 6/60 | Bolton | 248—22 X |
| 2,965,874 | 12/60 | Modrey | 248—223 X |
| 2,987,288 | 6/61 | Shanks | 248—224 |
| 3,028,606 | 4/62 | Boutet | 5—9 |
| 3,051,427 | 8/62 | Alvarez | 248—224 |
| 3,054,120 | 9/62 | Fronsoe | 5—9 |

FRANK B. SHERRY, *Primary Examiner.*